(12) United States Patent
Belmonte et al.

(10) Patent No.: US 7,979,068 B2
(45) Date of Patent: Jul. 12, 2011

(54) METHOD AND DEVICE FOR TRAVERSING A SCAN LIST IN A COMMUNICATION SYSTEM

(75) Inventors: John P. Belmonte, Schaumburg, IL (US); Dipendra M. Chowdhary, Hoffman Estates, IL (US); Yueh Ching Chung, Georgetown (MY); Hun Weng Khoo, Penang (MY); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 470 days.

(21) Appl. No.: 12/253,365

(22) Filed: Oct. 17, 2008

(65) Prior Publication Data

US 2010/0099397 A1    Apr. 22, 2010

(51) Int. Cl.
*H04W 4/00* (2009.01)

(52) U.S. Cl. ..... 455/434; 455/515; 455/516; 455/435.2; 455/552.1

(58) Field of Classification Search .................. 455/434, 455/515, 516, 435.2, 552.1
See application file for complete search history.

(56) References Cited

U.S. PATENT DOCUMENTS

| | | | | |
|---|---|---|---|---|
| 5,548,828 | A * | 8/1996 | Kozaki et al. | 455/161.2 |
| 6,057,783 | A * | 5/2000 | Kido | 340/7.42 |
| 7,190,937 | B1 * | 3/2007 | Sullivan et al. | 455/130 |
| 2004/0024896 | A1 | 2/2004 | Stafford | |
| 2006/0009216 | A1 | 1/2006 | Welnick | |
| 2006/0079224 | A1 | 4/2006 | Welnick | |
| 2007/0142046 | A1 | 6/2007 | Welnick | |

OTHER PUBLICATIONS

PCT International Search Report Dated April 26, 2010.

* cited by examiner

*Primary Examiner* — Kent Chang
*Assistant Examiner* — Dung Lam
(74) *Attorney, Agent, or Firm* — Valerie M. Davis

(57) ABSTRACT

A wireless communication device accesses a scan list that includes a plurality of scan members sorted at least by receive frequency and attempts to detect whether a call of interest exists on a receive frequency by performing a group scan for a group of scan members that are marked scan undone and that have the same corresponding receive frequency, wherein the group includes a first scan member and at least one other scan member. The group scan includes inspecting the receive frequency to obtain inspection results; using the inspection results to determine that there is no signal on the receive frequency having signal attributes that match a set of attributes for the first scan member; and using the inspection results to evaluate at least one of the other scan members in the group to determine whether there is a corresponding signal of interest on the receive frequency.

15 Claims, 2 Drawing Sheets

METHOD AND DEVICE FOR TRAVERSING A SCAN LIST IN A COMMUNICATION SYSTEM

TECHNICAL FIELD

The technical field relates generally to communication systems and more particularly to a method and device for traversing a radio's scan list in a communication system.

BACKGROUND

In some communication systems, wireless communication devices operating in these systems are required to monitor receive frequencies for multiple scan members on a scan list for radio frequency (RF) activity. To perform the monitoring, the wireless communication device switches between the receive frequency for each scan member on the list and scans or monitors for a signal of interest. If no signal of interest is found that corresponds to a given scan member, the wireless communication device tunes to the receive frequency of the next scan member to monitor for a signal of interest, and so on through the scan list.

A wireless communication device currently encounters some problems while traversing its scan list. Namely, as the number of scan members on the scan list increases, the amount of time between consecutive visits to a particular scan member on the scan list also increases. Moreover, as the time between consecutive visits to a particular scan member increases, the chances to arrive late to or completely miss a signal of interest increases. The net result of arriving late to a voice transmission is that the user may miss the first few words of a voice transmission. In other words, the user experiences voice truncation. The operational impact to late entry and, therefore, truncation is often described by the "Don't Fire!" example, wherein "Don't Fire" was transmitted, but the user hears "Fire" due to the voice truncation. Thus, even a single second of truncation can drastically change the meaning of a communication.

A known method of monitoring multiple frequencies at the same time is for the wireless communication device to be configured with a receiver circuit for each frequency being monitored. This would indeed address the problem, but this approach quickly becomes impractical and expensive as the number scan members and frequencies that need to be monitored increases.

Other approaches involve attempting to enhance the scanner hardware in the wireless communication device to more quickly switch between the receive frequencies associated with the scan members and more quickly detect RF energy on any given receive frequency. However, this approach can only take a scanner's optimization so far. The biggest impact to a scanner's ability to traverse the wireless communication device's scan list is interference, which, as the term is used herein, is defined as any signal on a receive frequency that is not of interest. More particularly, although it may only take tens of milliseconds to identify a receive frequency as free of RF energy; in some cases (for example when scanning for digital signals) it may take into the range of 500 ms to identify a signal present on a receive frequency as being of interest or not of interest. This is because, a scanner of digital signals must not only detect RF energy, it must synchronize to the receive frequency and read embedded identifiers before determining whether or not a detected signal is of interest. To minimize these times usually requires changes to over-the-air protocols used in the system, and such protocol changes may not always be possible.

Thus, there exists a need for a method and device for traversing a scan list for a wireless communication device.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
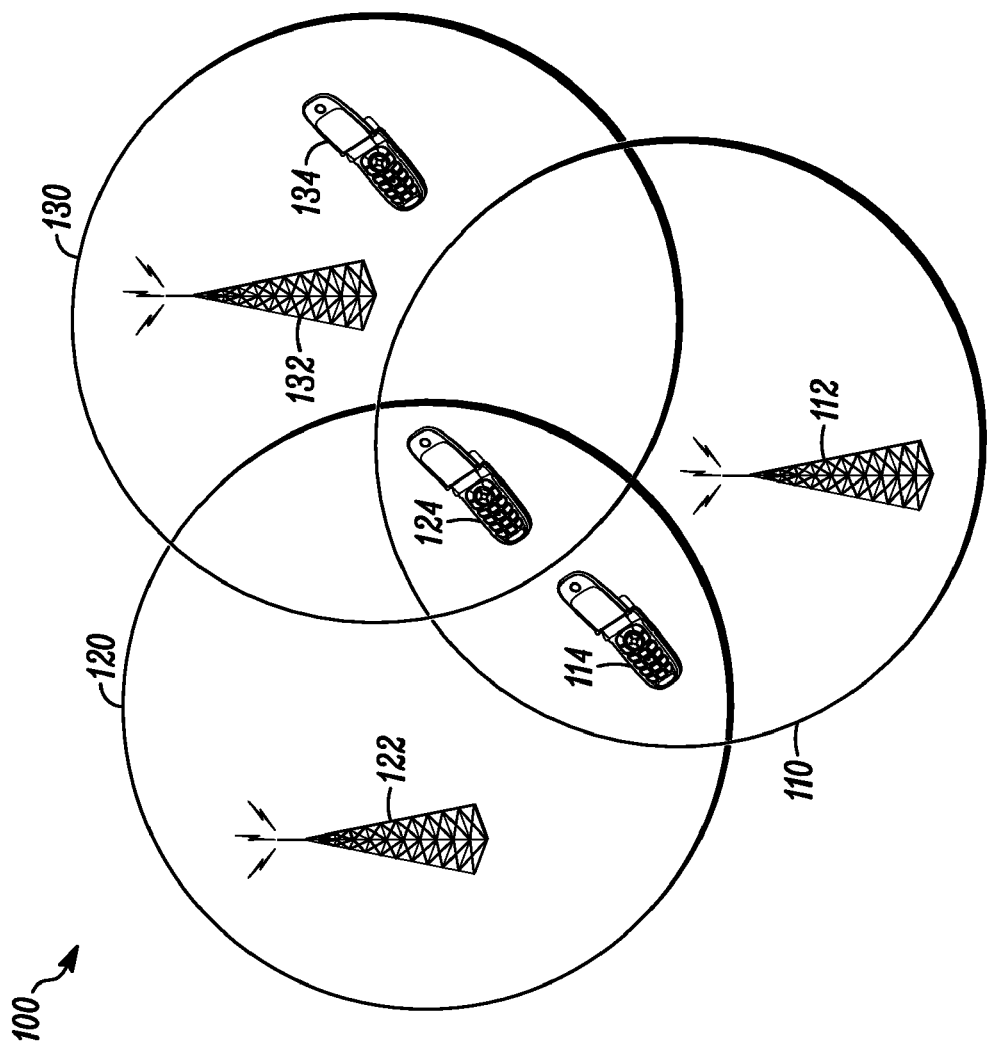
FIG. 1 is a block diagram of a wireless communication system in which may be implemented some illustrative embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a radio scanner uses a set of attributes associated with each scan member on a scan list to efficiently traverse the scan list in an attempt to detect a signal of interest. These attributes, and the interactions between them, enable a radio using embodiments disclosed herein to traverse the scan list in a more logical manner rather than treating each scan member independently. The attributes may include, for example, a mode identifying the scan member as analog or digital, a bandwidth associated with a receive frequency, a system identification, a slot number, and one or more identifiers.

More particularly, the scan members are sorted by receive frequency and their attributes. For example, digital scan members can be sorted according to mode, bandwidth, receive frequency, system identification, slot number, and one or more other identifiers. This will group analog and digital scan members together by receive frequency so as to minimize the number of times the radio switches between receive frequencies to perform a receive frequency inspection, thereby saving time in traversing the scan list. If adjacent scan members are on the same repeater (i.e., have the same system identification), the radio stays synchronized to the receive frequency and only switches slot numbers, thereby saving receive frequency inspection time.

Scan members with similar attributes are all evaluated at the same time. For example, after inspecting one receive frequency associated with a first scan member and finding signal attributes that do not match the attributes of the first scan member, a comparison is performed with scan members having similar attributes as the first scan member to find a match. If such a match is found, the signal is processed. If no match is found, the scan member is dismissed and marked "scan complete" if it is a non-priority scan member. Thus in accordance with the teachings herein, similar scan members are grouped and evaluated at the same time with fewer receive frequency inspections, and many scan members can be evaluated and potentially dismissed without performing a separate receive frequency inspection for each scan member (which can take about 500 ms to identify whether a digital signal is of interest), thereby saving time on the scan cycle. When all scan members have been evaluated once and all non-priority scan members are marked as scan complete, the scan cycle is complete. All scan members are then marked as "scan undone", and the process is repeated.

In another embodiment, a priority scan member is evaluated alternately with a non-priority scan member, and is never identified as "scan complete." Also, the inspection results associated with a priority scan member may result in a dismissal of one or more non-priority scan members.

Using methods in accordance with embodiments described herein, scan cycle time can be reduced by multiple seconds, wherein the scan cycle time is the amount of time it takes for a scanner to make one rotation through its scan list. Benefits are best realized when there is interference on every receive frequency; as the number of scan members in the scan list increases; and when the number of unique scan members (or scan members having no or very few common attributes) in the scan list is low. Those skilled in the art will realize that the above recognized advantages and other advantages described herein are merely illustrative and are not meant to be a complete rendering of all of the advantages of the various embodiments.

Referring now to the drawings and in particular to FIG. 1, a conventional wireless communication system 100 is depicted in which may be implemented some illustrative embodiments. It is well known that communication systems may be designed as trunked systems or conventional systems. In trunked systems, a limited number of channels are shared among a much larger number of users to facilitate efficient use of the system's communication resources. The infrastructure allocates these resources amongst the users using one or more control channels.

In conventional communication systems, a number of communication channels are also shared among a number of users (although the number of users is typically much smaller than in trunked systems). However, there is no control mechanism provisioned in the infrastructure to allocate the resources among the users in the system. Thus, in contrast to a trunked system, each channel in a conventional system is dedicated to one or more groups of users enabling the users to control access to the channels by manually selecting a channel or selecting a talkgroup that is assigned to a particular channel.

System 100 comprises sites 110, 120, and 130 each having at least one infrastructure device (hereinafter referred to as a repeater) located in a geographic coverage area as indicated by the circles drawn in the figure, wherein the coverage areas have some degree of overlap. More particularly, site 110 includes a repeater 112 that manages at least one channel within the coverage area of site 110. Site 120 includes a repeater 122 that manages at least one channel within the coverage area of site 120. Site 130 includes a repeater 132 that manages at least one channel within the coverage area of site 130. Moreover, each site may be associated with a different system identification such as a color code, a Network Access Code, a PL (private line) tone or a DPL (digital private line) word (but all will hereinafter be referred to as a color code) that uniquely identifies transmissions from the repeater at the site.

Further illustrated is a wireless communication device (hereinafter referred to as a radio) 114 operating within the overlapping coverage areas of sites 110 and 120, a radio 124 operating within the overlapping coverage areas of sites 110, 120 and 130, and a radio 134 operating in site 130. Although not illustrated, the radios operating in the system can be members of one or more talkgroups for purposes of communicating within the network. As a member of a given talkgroup, the radio is authorized to receive or "hear" transmissions by other members of the talkgroup and is authorized to transmit to other members of the talkgroup.

The radios are also associated with one or more identifiers used to differentiate between the intended receivers of information on a channel. For example, each radio is uniquely identified by a radio identifier (also commonly referred to as a "subscriber identifier", such as, for instance, a fifteen-digit International Mobile Subscriber Identifier (IMSI) or a 24-bit Subscriber Unit Identifier as described in the ETSI-DMR standard or a 24-bit Subscriber Unit Identifier as described in the Project 25 FDMA—Common Air Interface ANSI/TIA-102 standard). If the radio is a member of one or more talkgroups, the radio is further associated with one or more corresponding talkgroup identifiers that uniquely identify each talkgroup, such as, for instance, a 24-bit Talkgroup Identifier as described in the ETSI-DMR standard or a 24-bit Talkgroup Identifier as described in the Project 25 FDMA—Common Air Interface ANSI/TIA-102 standard). In an implementation, full radio or talkgroup identifiers or shortened versions of the identifiers (such as hashed identifiers created using a hashing function applied to the full identifier or truncated identifiers that omit some of the numbers of the full identifier) are embedded in a TDMA Common Announcement Channel (CACH) field and/or in one or more transmission units, such as in the embedded Link Control (LC) of multiple TDMA bursts.

Further, each radio has access to a scan list, which includes a plurality of scan members with corresponding receive frequencies the radio can scan to monitor for a signal of interest being transmitted in system 100. In an embodiment, the list is stored in the radio's memory. In accordance with the teachings herein, the radio implements various methods to efficiently traverse the scan list to monitor for a signal of interest. In an embodiment, a radio performs a method for traversing the scan list only when it is located in or near an overlapping area between two or more sites. Limiting the performance of the method to certain instances can save battery resources in the radio. However, the method can be continually performed or performed based on one or more other or additional criteria without departing from the scope of the teachings herein.

Since the radios are mobile, the radios and the repeaters communicate over an air interface using an air interface protocol that can be either standard or proprietary. One such standard is a Digital Mobile Radio (DMR) air interface standard (referred to above as the "ETSI-DMR standard"), which specifies various protocols used by two-way radios (that can both transmit and receive signals) at the data link layer (i.e., layer 2) of the well known seven-layer Open Systems Interconnection computer networking model, and which is described in ETSI TS (Technical Specification) 102 361-1 v1.4.5 (2007-12) published by European Telecommunication Standards Institute (ETSI). The ETSI-DMR standard specifies a two-slot Time Division Multiple Access (TDMA) structure that transmitting and receiving devices can utilize to send voice and/or data signals. The voice and data signals are transmitted in the TDMA slots in accordance with a general burst format specified in the standard. However, any other proprietary or standard air interface protocols could be used in system 100.

In addition, the radios and repeaters can communicate information over a channel using any modulation scheme including, but not limited to, TDMA (having any slotting structure), Frequency Division Multiple Access (FDMA), Code Division Multiple Access (CDMA), Orthogonal Frequency-Division Multiple Access (OFDMA), to name a few. As such, those skilled in the art will recognize and appreciate that the specifics of this example are merely illustrative of some embodiments and that the teachings set forth herein are applicable in a variety of alternative settings. Thus, since the teachings described do not depend on the environment, they can be applied to any type of wireless communication network or system having any number sites, repeaters and radios, wherein the radios have access to a scan list.

Referring again to FIG. 1, each repeater and radio is at least equipped with a transceiver (i.e., transmitter and receiver apparatus), a memory and a processing device and is further equipped with any additional components as needed for a commercial embodiment. The transceiver, memory and processing device can have any suitable physical implementation and are topologically coupled depending on the particular device implementation. These components are further operatively coupled and can be adapted, arranged, configured, and designed to perform methods in accordance with the teachings herein, for instance, as illustratively described by reference to FIG. 2.

In an illustrative embodiment, the radio receiver apparatus includes "scanner" hardware and software that automatically tunes, or scans, two or more discrete frequencies, to monitor for RF activity (either or both analog or digital). If RF activity above a pre-programmed threshold is detected, the radio compares decoded information associated with the detected RF activity to information in the radio's scan list associated with one or more scan members on the scan list to determine whether the scanned frequency has thereon a signal of interest to a user of the radio. In an embodiment, the scanner comprises a microprocessor that enables the scanner to store thousands of channels and monitor hundreds of channels in a few seconds.

As referred to herein, a radio includes, but is not limited to, devices commonly referred to as wireless communication devices, access terminals, mobile radios, mobile stations, subscriber units, user equipment, mobile devices, or any other device capable of operating in a wireless environment, and are all referred to herein simply as radios. Examples of radios include, but are not limited to, two-way radios, mobile phones, cellular phones, Personal Digital Assistants (PDAs), laptops and two-way pagers.

As used herein, a repeater is a device that is a part of a fixed network infrastructure and can receive information (either control or media, e.g., data, voice (audio), video, etc.) in a signal from a radio and transmit information in signals to one or more radios via a communication link. A repeater includes, but is not limited to, equipment commonly referred to as infrastructure devices, base radios, base stations, base transceiver stations, access points, routers or any other type of infrastructure equipment interfacing a wireless communication device in a wireless environment, and are all referred to herein simply as repeaters.

As mentioned earlier, the devices in system 100 communicate using communication links (also referred to herein as channels). The channels comprise physical channels and logical channels. The physical channels are the physical communication resources over which information is sent between the elements within system 100. The physical channels can comprise wired links or wireless links. If the physical channels comprise wireless links, the corresponding physical resource is an allocation of radio spectrum that is partitioned into radio frequency (RF) carriers at a given frequency (or rate of oscillation) and at a given bandwidth. As used herein, a frequency (which can be a receive frequency or a transmit frequency) and its associated bandwidth defines a particular physical channel in system 100.

For TDMA systems, each RF carrier is partitioned in time into logical frames and timeslots or simply slots. For example, the timeslots in a two-slot TDMA system are numbered slot "1" and slot "2". The timeslots in a four-slot TDMA system are numbered slot "1", slot "2", slot "3", and slot "4", and so on. Thus, each repeater is associated with multiple logical channels or slots at a single radio frequency. Moreover, logical channels are separated into two categories: traffic channels carrying speech or data information; and control channels carrying signaling, which is specifically concerned with the establishment and control of connections, and with the management of the physical channels in the system 100. Moreover, each repeater is further associated with a downlink channel for outbound transmissions from repeater to radio and an uplink channel for inbound transmission from radio to repeater. In an illustrative embodiment, a radio determines timeslot numbering by decoding a TDMA channel field in the CACH. The CACH is used to identify the timeslots numbers and indicate the status of the timeslots, for instance, whether the timeslots are busy with a transmission or are idle. The CACH can also carry other information such as low speed data.

As used herein, the terms communication and transmission are used interchangeably and refer to contiguous transmissions from one device on one channel. As it relates to TDMA, the terms communication and transmission refer to TDMA bursts emanating from one device in one timeslot. As such, transmissions may generically refer to voice, data, or control information relating to system 100. The term call refers to related voice transmissions between different radios in system 100, wherein an idle state on the channel separates successive related transmissions within a call. The term signal generally refers to any detected RF activity on a channel above a threshold and may, thus, generically refer to voice, data, or control information on the channel, which includes transmissions (e.g., PL and DPL analog transmissions) that indicate that the channel is in an idle state or in a state of hangtime or that indicate an analog call, wherein all parties to the call are currently silent.

Also, in the wireless communication system 100, the various scan members can be associated with different priority levels that may be assigned based upon some communications being perceived as more important than other communications for various reasons. For example, scan members identifying emergency transmissions and/or transmissions from a supervisor may be assigned a higher priority than other scan members. Accordingly, a radio may be required to monitor scan members having different priority levels in which one or more scan members are designated as "low" or "lower" priority scan members or non-priority scan members and some scan members are designated as "high" or "higher" priority scan members or simply as priority scan members.

Figure 2:
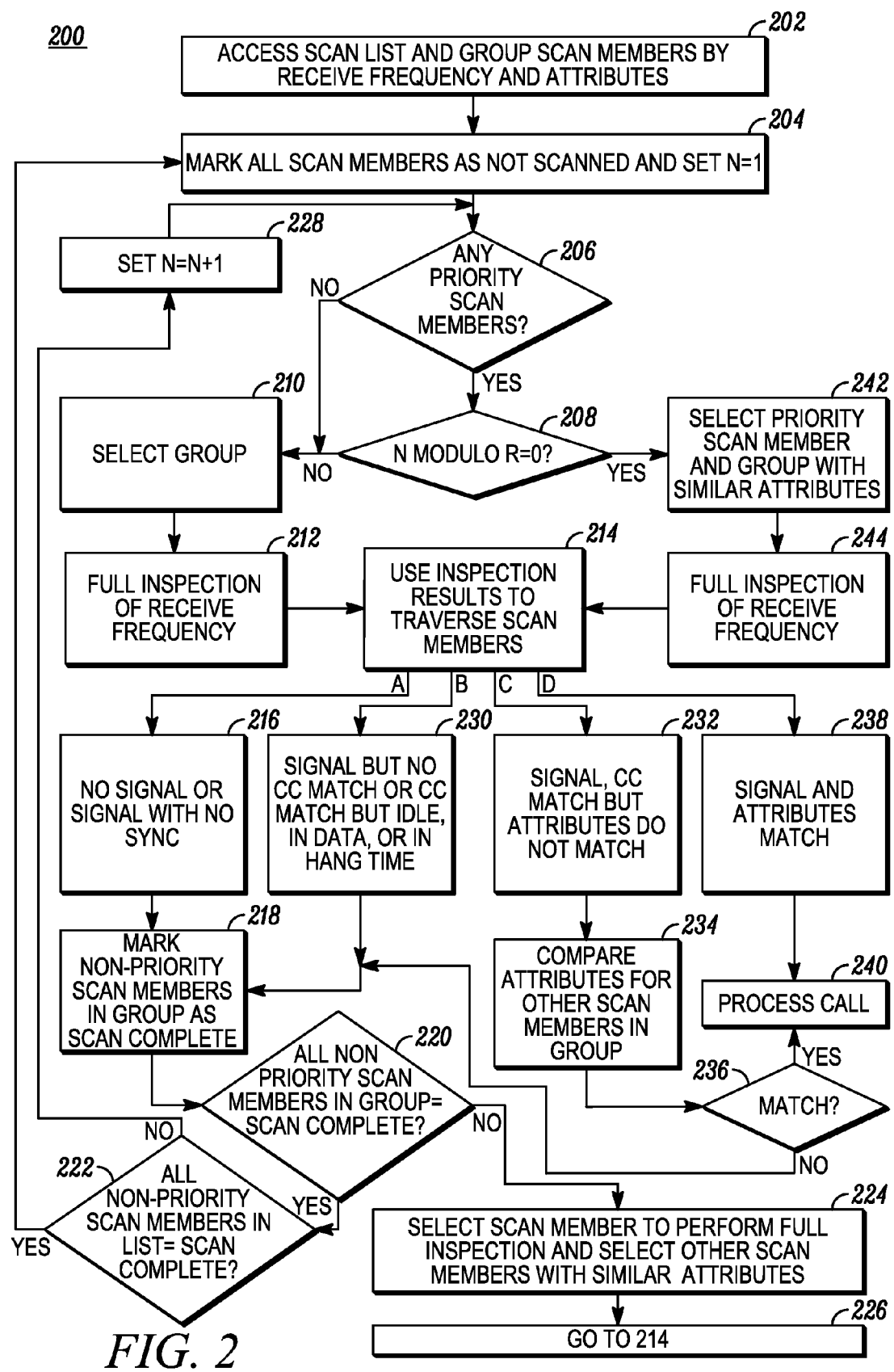
FIG. 2 is a flow diagram of a method for traversing a scan list in accordance with an illustrative embodiment.

Turning now to FIG. 2, depicted therein is a method 200 for traversing a scan list that is performed in a radio scanner of a radio operating in an overlapping coverage area of a communication system, in accordance with an illustrative embodiment. In operation, the radio accesses (202) its scan list, which comprises a plurality of scan members. A radio such as a multi-mode radio that can access different communication systems could have access to multiple scan lists. A scan member is an entry on the scan list and has associated therewith a receive frequency and a set (one or more) of attributes that the radio can use to identify a signal on the receive frequency associated with the scan member as of interest. For example, the set of attributes for a scan member can include, but is not limited to, the mode identifying the scan member as analog or digital, receive frequency bandwidth, color code, slot, and talkgroup identifier to name a few.

Table 1 below shows an illustrative scan list. As can be seen, the scan list includes 16 scan members (1 analog and 15 digital). Each scan member has a corresponding receive frequency, which the radio is configured to use for its communications. The set of attributes for the analog scan member includes the mode identifying the scan member as analog and a bandwidth (BW) associated with the receive frequency. Besides 12.5 kHz (as shown in Table 1), other illustrative bandwidths include 6.25 kHz, 7.5 kHz, 15 kHz, 20 kHz, 25 kHz, 30 kHz, and 50 kHz. The set of attributes for the digital scan members includes the mode identifying the scan member as digital, bandwidth associated with the receive frequency, color code, slot, and talkgroup identifier (indicated as a letter) in this example implementation. In different implementations, an analog scan member or a digital scan member may have fewer or more attributes than shown in Table 1.

TABLE 1

| Scan member Number | Mode | BW | Receive Freq | Color Code | Slot Number | Talk Group ID |
|---|---|---|---|---|---|---|
| 1 | Analog | 12.5 | 403.000 | n/a | n/a | n/a |
| 2 | Digital | 12.5 | 402.000 | 1 | 1 | A |
| 3 | Digital | 12.5 | 402.000 | 1 | 1 | B |
| 4 | Digital | 12.5 | 402.000 | 1 | 1 | C |
| 5 | Digital | 12.5 | 402.000 | 1 | 2 | D |
| 6 | Digital | 12.5 | 402.000 | 1 | 2 | E |
| 7 | Digital | 12.5 | 402.000 | 1 | 2 | F |
| 8 | Digital | 12.5 | 401.000 | 2 | 1 | G |
| 9 | Digital | 12.5 | 401.000 | 2 | 1 | H |
| 10 | Digital | 12.5 | 401.000 | 2 | 1 | I |
| 11 | Digital | 12.5 | 401.000 | 2 | 2 | J |
| 12 | Digital | 12.5 | 401.000 | 2 | 2 | K |
| 13 | Digital | 12.5 | 401.000 | 2 | 2 | L |
| 14 | Digital | 12.5 | 400.000 | 3 | 1 | M |
| 15 | Digital | 12.5 | 400.000 | 3 | 1 | N |
| 16 | Digital | 12.5 | 400.000 | 3 | 1 | O |

In accordance with the teachings herein, scan members are sorted by receive frequency and by their attributes to minimize the scanner switching between frequencies and to minimize the number of full inspections of receive frequencies performed by the radio during a complete scan cycle. The grouping can be performed and configured into a radio at manufacture and then updated as needed either by the radio or by an infrastructure device or other device external to the radio and then communicated to the radio via a wired or wireless link. In any event, the grouping is optimized to facilitate efficient traversing of the scan list. Upon radio power-up, if all non-priority scan members are marked scan completed, upon movement of the radio to a different communication system or after processing a call on a scan member, for instance, the radio marks (204) all scan members on the list as not scanned, not reviewed, not evaluated, or "scan undone" to restart the scanning process and initializes a counter (e.g., "N"=1) to begin traversing the scan list. The counter N is set if the scan list includes some priority scan members and is used to determine when a priority scan member should be evaluated.

If (206) there are no priority scan members to evaluate or if N indicates that a non-priority scan member is to be next evaluated, the radio proceeds to process the non-priority scan members (beginning at 210). However, if (206) there are priority scan members, the radio proceeds (208) with a priority scan member evaluation some of the time (i.e., if N modulo R is zero, wherein R specifies how often to inspect the priority scan member, e.g., R=2, then inspect priority member every $2^{nd}$ inspection, R=3, then inspect priority member every $3^{rd}$ inspection, etc.).

Accordingly, if there are no priority scan members to evaluate or if N modulo R=0 is not satisfied, the radio selects (210) a group of one or more scan members from the scan list having the same receive frequency and performs (212) a full inspection of the receive frequency for the group to evaluate one of the scan members in the group. Whereas, if there are priority channels members to evaluate and N modulo R=0 is satisfied, the radio selects (242) a priority scan member having a given receive frequency and can also select (if available) a group of one or more additional scan members with similar attributes from the scan list and performs 244 a full inspection of the receive frequency to evaluate the priority scan member. The group is typically a subset of the scan members from the scan list that are marked scan undone.

The size of the group depends on the similarities in attributes between various scan members. For example, for unique scan members, the "group" includes a single scan member (e.g. scan member 1 in Table 1). Other groups can have different sizes. Based on the scan list shown in Table 1, a group of scan members can include scan members 2 through 7, 8 through 13, or 14 through 16 having the same mode, bandwidth, receive frequency, and color code. In a different implementation, a group of scan members could include scan members 2 through 4, 5 through 7, 8 through 10, 11 through 13, and 14 through 16 having the same mode, bandwidth, receive frequency, color code and slot number.

A radio performing a full inspection of a receive frequency for an initial scan member means that the radio receiver tunes to the receive frequency and associated bandwidth for an initial scan member and monitors for RF energy to generate inspection results to use (214) to evaluate at least the one initial priority or a non-priority scan member. In accordance with the teachings herein, the inspection results are further used (214) to evaluate at least one other scan members in a group (selected at 210 or 242) to determine whether a signal of interest is on the receive frequency. When the radio uses the results of a single receive frequency inspection to evaluate two or more scan members, this is called a "group scan", which is different that scanning techniques known in the art.

If the inspection results indicate that no RF energy (no signal) is detected, the initial non-priority scan member evaluated using the inspection results is marked scan complete. If the inspection results indicate that RF energy is detected, the radio demodulates and decodes the signal (using any suitable demodulation and decoding technique) to obtain further inspection results that includes a set attributes of the signal (i.e., signal attributes). The radio compares the signal attributes to the set of attributes of the selected scan members to identify if the detected signal is or is not of interest. If the signal attributes match all of the attributes of any one scan member of the group being evaluated, the radio knows that it has detected a signal of interest on the receive frequency corresponding to that scan member. By contrast, when the signal attributes fail to match at least one attribute in the set of attributes for a given scan member being evaluated, the scan member is marked as scan complete (if it is a non-priority scan member), and the radio proceeds to evaluate the next scan member.

At 214, the radio uses the inspection results obtained in 212 or 244 to traverse the scan members selected at 210 or 242. How, the radio traverses the scan members depends on the inspection results and on the particular attributes of the scan members within the group. If there is only one scan member in the group, and the inspection results indicate that there is no signal of interest on the receive frequency (in this case, there is either no signal at all detected or the signal has signal attributes that fail to match at least one attribute of the single scan member), the radio proceeds with the method at 222. FIG. 2 illustrates four different additional inspection result scenarios ("A", "B", "C", and "D") of a radio traversing a scan list, for instance the one shown in Table 1, applicable during a group scan. However, an infinite number of scenarios can be contemplated. A discussion of each of scenarios A, B, C, and D follows in turn.

Under scenario A, the inspection results indicate (216) no signal or RF activity on the receive frequency for an initial scan member or indicate a signal with no associated synchronization (SYNC) bits, symbols, message, etc. The format of the SYNC can vary and can depend, for example, on a protocol (either standard, e.g., the ETSI-DMR standard, or proprietary) in accordance with which the radio is operating. Where the radio is operating in a DMR system, for example, the SYNC is included in a 48 bit field (24 symbols) in the center of some TDMA bursts. The SYNC is provided by a special sequence of bits (or symbols) that mark the location of the center of the TDMA burst so that a radio can synchronize to the receive frequency. Once the radio is synchronized, it can use pattern matching to determine the type of SYNC to identify the contents of the burst. Multiple SYNC patterns are used to differentiate voice bursts from data/control bursts, differentiate inbound channels from outbound channels, and identify the source device type. For example, four different SYNCs are used in the ETSI-DMR standard to indicate repeater sourced voice, repeater sourced data, radio sourced voice, and radio sourced data, and each SYNC is 5 ms long. In other systems, SYNC may be, for example, a sequence of bits or symbols at the beginning of a transmission.

Under scenario A, the radio uses the inspection results to determine that there is no signal on the receive frequency having signal attributes that match the set of attributes for the initial scan member being evaluated and marks (218) the initial scan member as scan complete (dismissed) if it is a non-priority scan member. The radio also marks (218) as scan complete (dismisses) all non-priority scan members in the group with the same mode, bandwidth, and receive frequency as the initial scan member that was evaluated. More particularly, if the inspection results indicate no signal on the receive frequency and no signal of interest corresponding to the initial scan member, the radio uses these inspection results to dismiss any other scan member in the selected group having the same receive frequency and bandwidth as the initial scan member. If the inspection results indicate a signal without a SYNC on the receive frequency that does not correspond to an initial digital scan member, the radio uses these inspection results to dismiss any other scan member in the selected group having the same mode, receive frequency and bandwidth as the initial scan member.

For example, the radio: selects a group comprising scan members 2 through 7 of Table 1; and performs a full inspection of the receive frequency at the bandwidth of scan member 2 to generate inspection results in scenario A. Based on the inspection results for scan member 2, the radio marks channels 3 through 7 as scan complete (assuming that they are all non-priority scan members) without having to perform a separate inspection for each of these scan members. If scan member 2 is also non-priority, the radio marks this scan member as scan complete. In an embodiment, priority channels are never marked as scan complete. Based one the inspection results of one receive frequency inspection, the radio evaluates six scan members on the scan list; whereas prior art scanners would perform six separate receive frequency inspections to evaluate the six scan members. If RF energy is detected, the method in accordance with the embodiments herein would take around 500 ms to complete (for this example of six scan members) as compared to prior art techniques that could take over three seconds to complete.

If (220) all non-priority scan members in the selected group are marked scan complete (as in this example), the radio determines (222) if all non-priority scan members in the scan list are marked scan complete. If there are remaining scan members in the group that are still marked scan undone, the radio selects (224) a next scan member in the selected group to perform a full inspection and selects any other scan members in the group with similar attributes; and returns (226) to 214 of the flow diagram. If there are remaining scan members on the scan list, the radio increases the counter (e.g., sets N=N+1) and continues method 200 at 206. If all non-priority scan members on the scan list are marked scan complete, the radio continues method 200 at 204.

Under scenario B, the inspection results indicate (230) a signal with SYNC and a set of signal attributes on the channel that includes a mode and slot number that matches that of the initial scan member. However, either: a color code in the signal attributes fails to match the color code of the initial evaluated scan member; or the color code in the signal attributes matches the color code of the evaluated scan member but the signal is currently in an idle or hangtime state, the signal comprises a data continuation transmission (such as is defined in the ETSI-DMR standard), or a Terminator transmission (such as is defined in the ETSI-DMR standard). Under scenario B, the radio uses the inspection results to determine that there is no signal on the receive frequency having signal attributes that match the set of attributes for the initial scan member being evaluated and marks (218) the initial scan member as scan complete if it is a non-priority scan member. The radio also marks (218) as scan complete all non-priority scan members in the group with the same mode, bandwidth, receive frequency, color code, and slot as the initial scan member that was evaluated and continues method 200 at 220.

We take again the above example where the radio selects a group comprising scan members 2 through 7 of Table 1 and performs a full inspection of the receive frequency at the bandwidth of scan member 2. In this case, wherein inspection results are generated in scenario B, the radio marks channels 3 through 4 as scan complete (assuming that they are non-priority channels) because they specify the same slot number. In this example, however, there are scan members 5-7 remaining in the selected group because they specify a different slot number, so the radio selects (224) one of those scan members (e.g., scan member 5) to perform the next full inspection at its corresponding receive frequency and proceeds (226) to 214 in method 200 to use the inspection results to evaluate scan member 5 and one or more of the remaining scan members in the group.

Under scenario C, the inspection results indicate (232): a signal with SYNC on the channel that is either a voice transmission or the beginning of a data transmission (as indicated by the decoding of a data preamble, e.g., a CSBK preamble in the ETSI-DMR standard); and detected signal attributes of mode, bandwidth, color code, and slot that matches the attributes of the initial scan member being evaluated; and a signal attribute of an identifier that fails to match the identifier attribute for the initial scan member being evaluated. Under scenario C, the radio compares (234) the detected identifier with the identifier attribute of one or more other scan members in the group having similar attributes to the detected signal (in this case having the same mode, bandwidth, color code, and slot as the detected signal). The comparison 234 is performed until a matching identifier (236) is found (in which case, the radio processes (240) the data or voice call on that receive frequency) or until all of the scan members having the similar attributes are considered (in which case, the radio continues method 200 at 218 by marking all of the evaluated non-priority scan members as scan complete).

We take again the above example where the radio selects a group comprising scan members 2 through 7 of Table 1 and performs a full inspection of the receive frequency at the bandwidth of scan member 2. In this case, wherein inspection results are generated in scenario C, the radio compares the detected signal identifier with the talkgroup identifier of scan members 2, 3 and 4 until it finds a matching identifier or until it has completed the evaluation (in this case simply a comparison of identifiers) for all scan members, whichever comes first.

Finally, under scenario D, the inspection results indicate (238) that the detected signal attributes completely match the attributes of the initial scan member being evaluated and perhaps one or more other scan members in the selected group. So the radio processes (240) the signal on that receive frequency, and in one illustrative embodiment processes the signal of interest corresponding to the scan member having the most matching attributes. For example, the radio performs an inspection of the receive frequency at the bandwidth of scan member 2, and the inspection results indicate that the detected signal attributes of mode, bandwidth, color code, slot, and talkgroup identifier match those of scan member 2. After processing the call, in one embodiment, the radio continues method 200 at 204 upon expiration of a scan hangtime at the end of the call. In another embodiment, the radio continues method 200 at 224.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for channel scanning described herein. The non-processor circuits may include, but are not limited to, a radio receiver, a radio transmitter, signal drivers, clock circuits, power source circuits, and user input devices. As such, these functions may be interpreted as steps of a method to perform the channel scanning described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for traversing a scan list, the method comprising:
   accessing a scan list comprising a plurality of scan members each having a corresponding receive frequency and set of attributes used by a wireless communication device to identify whether a corresponding signal of interest is on the receive frequency; and
   performing a group scan on a first group of scan members comprising a first subset of the plurality of scan members that are marked scan undone and that have a same corresponding first receive frequency, wherein the group comprises a first scan member and at least one other scan member, wherein the group scan comprises:
   inspecting the first receive frequency to obtain first inspection results;
   using the first inspection results to determine that there is no signal on the first receive frequency having signal attributes that match the set of attributes for the first scan member; and using the first inspection results to evaluate at least one of the other scan members in the first group to determine whether there is a corresponding signal of interest on the first receive frequency.

2. The method of claim 1 further comprising marking the first scan member as scan complete.

3. The method of claim 1, wherein each of the scan members on the scan list is either a priority scan member or a non-priority scan member, and only non-priority scan members are marked as scan complete.

4. The method of claim 1 further comprising:
   only upon determining based on the first inspection results that there is no signal on the first receive frequency having signal attributes that match the set of attributes for any of the other scan members in the first group, and performing a group scan on a next group of scan members comprising a second subset of the plurality of scan members that are marked scan undone and have a same corresponding second receive frequency that is different than the first receive frequency.

5. The method of claim 1, wherein:
   the first receive frequency is associated with a first bandwidth that is included in the set of attributes for the first scan member;
   the first inspection results indicate no signal on the first receive frequency;
   using the first inspection results to evaluate the at least one other scan member in the first group comprises determining that there is no signal on the first receive frequency that corresponds to any other scan members in the first group having attributes that include the first bandwidth.

6. The method of claim 1, wherein:
   the first inspection results indicate a signal without a synchronization on the first receive frequency;
   the set of attributes for the first scan member includes a mode that identifies the scan member as digital;
   using the first inspection results to evaluate the at least one other scan member in the first group comprises determining that there is no signal on the first receive frequency that corresponds to any other scan members in the first group having attributes that include the mode that identifies the scan member as digital.

7. The method of claim 1, wherein:
   the first receive frequency is associated with a first bandwidth that is included in the set of attributes for the first scan member;
   the first inspection results indicate a signal on the first receive frequency having signal attributes comprising a first mode and a first slot number that are included in the set of attributes for the first scan member;
   the signal attributes further include a first system identification that is different than a second system identification included in the set of attributes for the first scan member;
   using the first inspection results to evaluate the at least one other scan member in the first group comprises determining that there is no signal on the first receive frequency that corresponds to any other scan member in the first group having attributes that include the first bandwidth, the first mode, the second system identification, and the first slot number.

8. The method of claim 1, wherein:
   the first receive frequency is associated with a first bandwidth that is included in the set of attributes for the first scan member;
   the first inspection results indicate a signal on the first receive frequency having signal attributes comprising a first mode, a first system identification, and a first slot number that are included in the set of attributes for the first scan member;
   the first inspection results indicate an idle state on the first receive frequency;
   using the first inspection results to evaluate the at least one other scan member in the first group comprises determining that there is no signal on the first receive frequency that corresponds to any other scan member in the first group having attributes that include the first bandwidth, the first mode, the first system identification, and the first slot number.

9. The method of claim 1, wherein:
   the first receive frequency is associated with a first bandwidth that is included in the set of attributes for the first scan member;
   the first inspection results indicate a signal on the first receive frequency comprising a data continuation transmission and having signal attributes comprising a first mode, a first system identification, and a first slot number that are included in the set of attributes for the first scan member;
   using the first inspection results to evaluate the at least one other scan member in the first group comprises determining that there is no signal on the first receive frequency that corresponds to any other scan member in the first group having attributes that include the first bandwidth, the first mode, the first system identification, and the first slot number.

10. The method of claim 1, wherein:
    the first receive frequency is associated with a first bandwidth that is included in the set of attributes for the first scan member;
    the first inspection results indicate a signal on the first receive frequency having signal attributes comprising a first mode, a first system identification, and a first slot number that are included in the set of attributes for the first scan member;

the first inspection results indicate a state of hangtime on the first receive frequency;

using the first inspection results to evaluate the at least one other scan member in the first group comprises determining that there is no signal on the first receive frequency that corresponds to any other scan member in the first group having attributes that include the first bandwidth, the first mode, the first system identification, and the first slot number.

11. The method of claim 1, wherein:

the first receive frequency is associated with a first bandwidth that is included in the set of attributes for the first scan member;

the first inspection results indicate a signal on the first receive frequency comprising a terminator transmission and having signal attributes comprising a first mode, a first system identification, and a first slot number that are included in the set of attributes for the first scan member;

using the first inspection results to evaluate the at least one other scan member in the first group comprises determining that there is no signal on the first receive frequency that corresponds to any other scan member in the first group having attributes that include the first bandwidth, the first mode, the first system identification, and the first slot number.

12. The method of claim 1, wherein:

the first receive frequency is associated with a first bandwidth that is included in the set of attributes for the first scan member;

the inspection results indicate a first signal having signal attributes comprising a first mode, a first system identification, and a first slot number that are included in the set of attributes for the first scan member;

the signal attributes further comprise a first identifier that does not match a second identifier included in the set of attributes for the first scan member;

using the first inspection results to evaluate the at least one other scan member in the first group comprises, for other scan members in the first group having attributes that include the first bandwidth, the first mode, the first system identification, and the first slot number, comparing the first identifier to an identifier included in the corresponding set of attributes until a matching identifier is found or until all of the other scan members in the first group having attributes that include the first bandwidth, the first mode, the first system identification, and the first slot number have been compared.

13. The method of claim 12 further comprising marking as scan complete the other scan members in the first group that were compared without finding a matching identifier.

14. The method of claim 1, wherein the plurality of scan members are sorted by receive frequency and the set of attributes.

15. A device for traversing a scan list comprises:

a transceiver for detecting a signal; and a processing device coupled to the transceiver for:

accessing a scan list comprising a plurality of scan members each having a corresponding receive frequency and set of attributes used by a wireless communication device to identify whether a corresponding signal of interest is on the receive frequency, wherein the scan list is sorted at least by receive frequency; and performing a group scan on a first group of scan members comprising a first subset of the plurality of scan members that are marked scan undone and that have a same corresponding first receive frequency, wherein the group comprises a first scan member and at least one other scan member, wherein the group scan comprises:

inspecting the first receive frequency to obtain first inspection results;

using the first inspection results to evaluate multiple scan members in the first group to determine whether there is a corresponding signal of interest on the first receive frequency.

* * * * *